July 16, 1957   K. FEDERN ET AL   2,799,168
BALANCE MEASURING APPARATUS FOR ELASTIC ROTORS
Filed May 19, 1954   2 Sheets-Sheet 1

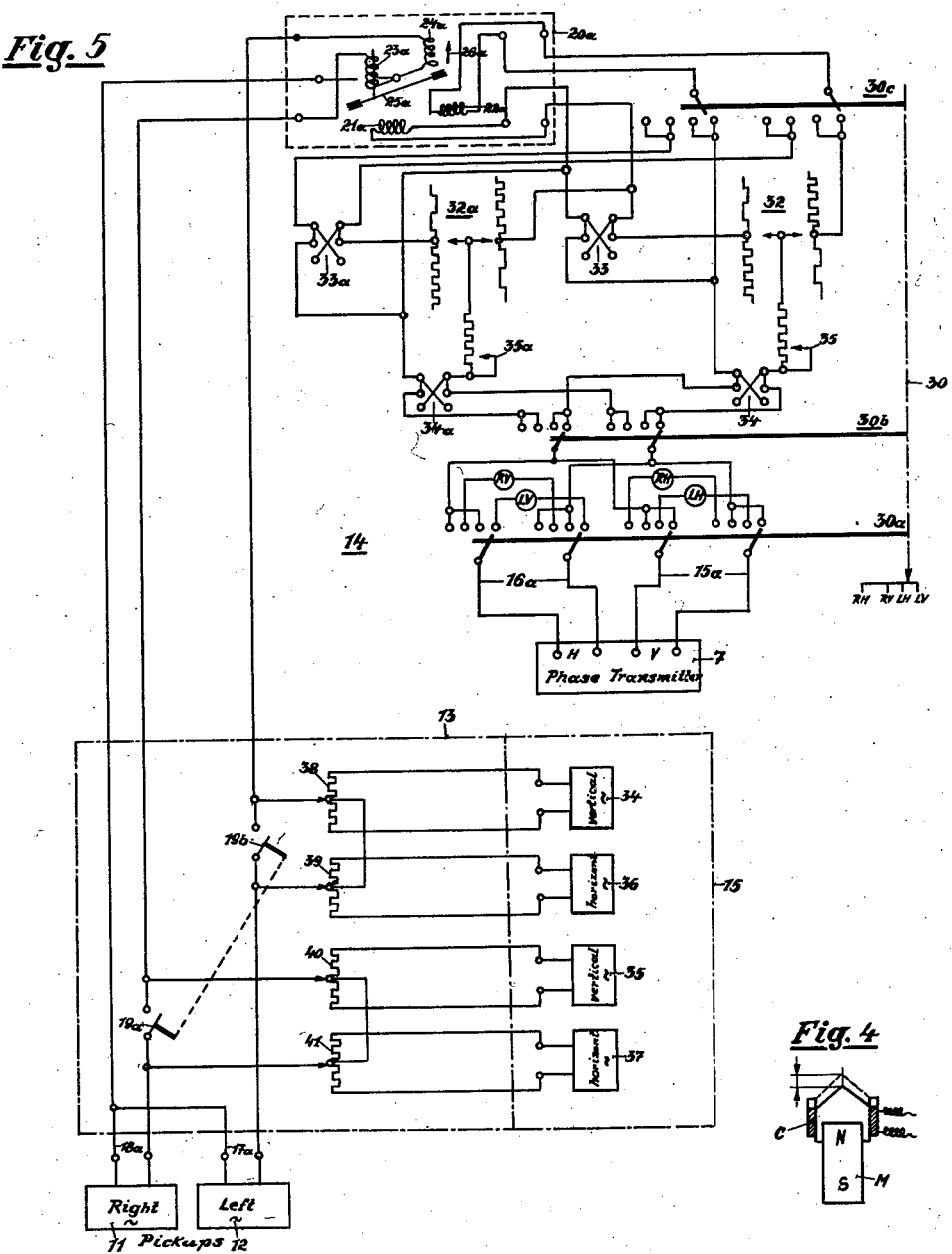

2,799,168

Patented July 16, 1957

2,799,168

BALANCE MEASURING APPARATUS FOR ELASTIC ROTORS

Klaus Federn, Darmstadt, and Heinz Haardt, Darmstadt-Eberstadt, Germany, assignors to Carl Schenck Maschinenfabrik G. m. b. H., Darmstadt, Germany, a corporation of Germany Application May 19, 1954, Serial No. 430,941

11 Claims. (Cl. 73—462)

Our invention relates to balancing machines and is directed particularly to a means for balancing non-rigid or elastic rotating bodies.

In dynamic balancing machines of the conventional type, the unbalance of a rotor being tested manifests itself by vibrations of the oscillatorily mounted machine bearings in which the rotor is kept in revolution while the test is being performed. The vibrations are sensed by electric pickups, and the alternating voltages generated by the pickups are applied to an electric analyzing system in which the pickup voltages are compared with an alternating reference voltage of constant amplitude synchronous with the speed of the revolving rotor. The vibration pickups used are either amplitude responsive or pressure responsive, depending upon whether the rotor being balanced runs above or below its critical speed. Moving-coil pickups, such as those having a coil oscillatorily movable in an annular gap of a permanent magnet, have been used for response to amplitude, while piezoelectric crystals or variable-resistance strain gauges have been employed as pressure-responsive pickups. The phase-reference generator for supplying the alternating reference voltage is usually a dynamoelectric machine coupled with the rotor to revolve together therewith. Photoelectric and commutator-type devices have also been employed for this purpose. It is further known to provide a balancing machine, for calibrating purposes, with an additional generator of the same type as the phase-reference generator.

In techniques for balancing of rotors, a distinction is made between rigid and elastic rotors. This distinction, not strictly definable theoretically, is predicated upon many years of practical experience. Accordingly, a rotor is considered rigid if its maximum normal speed of rotation is less than 0.5 to 0.6 times its fundamental critical revolving speed. The critical speed is the theoretical speed at which the rotor is no longer capable of resisting bending deflections of any amplitude, the centrifugal force and elastic return force being in balance for each mass particle. Designated as elastic are those rotors whose normal speeds of operation are above 0.5 to 0.6 times the fundamental critical revolving speed. Modern engineering developments, favoring increased speeds of revolution in various machines and engines have resulted in an increasing demand for the balancing of rotors that approach the range of elastic bodies or are within that range.

While rigid rotors can be completely balanced with reference to two correction planes, such two-plane balancing is not possible with elastic rotors. Although the addition of balancing weights in two correction planes of an elastic body may often suffice to secure to quiet run for a single, definitely determined speed of revolution, only slight changes in speed are in most cases sufficient to produce disturbing oscillations in the bearings because such speed variations change the bending deflection of the body and thereby also its condition of balance.

For the foregoing reason, elastic bodies must be balanced in three different planes. The usual procedure in balancing such a body is first to consider it as a rigid rotor and balance it at a speed below 0.5 to 0.6 times the fundamental critical speed with reference to only two correction planes until a quiet run is secured. Next, the body is placed in revolution at a higher speed, preferably between 0.75 to 0.9 of the fundamental critical speed, so that the revolving body is subjected to bending deflection. The oscillations at the bearings of the balancing machine resulting from these deflections are then measured as to magnitude and angular position. As is known, a triple set of weights can be determined which secures a quiet run of the rotor over the entire range of revolving speeds including the critical speed. Such a triple set of weights is finally applied to the rotor being corrected. These weights comprise an intermediate weight located in a third correction plane between the two original correction planes, and two equalizing weights located at mutually opposite positions in the two outer correction planes, the moment arm (in ounce inches) of each outer weight being one-half of the value of that produced by the intermediate weight. The triple set of weights is thus statically and dynamically in balance and does not affect the balance condition of a rigid body. With the elastic body, however, the weights of the triple set act in opposition to the deflection caused by moment forces between the outer two correction planes and take care that, even when approaching the critical revolving speed, any disturbing deflection remains sufficiently slight to insure quiet operation.

It will be recognized that the balancing of elastic bodies as heretofore practiced requires at least two measuring runs, namely, a first run at a low speed for determining a set of balancing weights as needed if the body were a rigid rotor, and a second run at a higher speed which is performed after the first set of balancing weights is attached and which serves to measure the bending deflection as to magnitude and angular position for the purpose of determining the triple set of weights. When attaching the triple weights thus determined, it is often desirable to combine the two outer weights of the triple set with the originally determined balancing weights so that only one correction weight will be needed in each of the two outer correction planes. This requires first adding the two balancing weights originally found when the body was treated as a rigid rotor, and later removing each of these two weights and replacing it by a new weight that combines the magnitude and position of the original weight with the magnitude and position of the last-found weight of the triple set.

It is the primary object of our invention to improve and simplify the balancing of elastic rotors so that a single measuring process will suffice for conjointly determining the balancing weights in all three correction planes according to magnitude and angular position so that any attachment of weights becomes necessary only after all unbalance measurements are completed.

This object is achieved, according to our invention, by the provision of a special generator, its particular connection in circuit with an unbalance analyzing network of a balancing machine, and a novel measuring method. The special generator is hereinafter called the "neutralizing generator" for distinction from the conventional phase-reference generator. The specific features and operation of the neutralizing generator will be described presently.

If a vibration pickup of the type used in the above-described conventional balancing machines is operated with a variable rotor speed and with an amplitude that corresponds to a constant unbalance of the rotor, then the measuring device controlled by the pickup voltage will have an indicating deflection depending upon the speed of revolution. In machines operating above the critical rotor speed, which usually use amplitude-responsive pickups, the amplitude of motion of the moving coils of the individual pickups within the annular gap of their permanent magnet increases directly with speed. Consequently the electromotive force produced by the pickups increase in linear proportion to the revolving speed. The pointer deflection of the measuring instrument is therefore approximately linearly proportional to the revolving speed. In machines operating below critical speed, which usually use pressure-responsive pickups, for instance piezoquartz crystals or strain gauges, the pickups produce in the measuring instrument a deflection increasing approximately with the square of the revolving speed.

It is a more specific feature of the invention that it provides a neutralizing generator of such character and so connected for rotation with the rotor being balanced that the generator output varies with speed of rotation in the same way as the corresponding variation in the associated pickups, and yet is independent of unbalance forces in the rotor. The neutralizing generator output voltages are connected in opposition to the pickup voltages, whereby the difference voltages from the pickups responsive to unbalance are substantially independent of the speed of the rotor.

The foregoing and other features, set forth with particularity in the claims annexed hereto, as well as further, more specific objects and advantages of the invention will be apparent from the following description of the embodiments illustrated by the drawings, wherein like reference numerals denote corresponding parts throughout the several views.

In the drawings:

Fig. 4 is a schematic drawing illustrating the construction of an amplitude-responsive moving-coil pickup; and Fig. 5 is a schematic diagram of the electrical circuit for analyzing unbalance in elastic rotating bodies in accordance with the invention.

Figures 1, 2, 3:
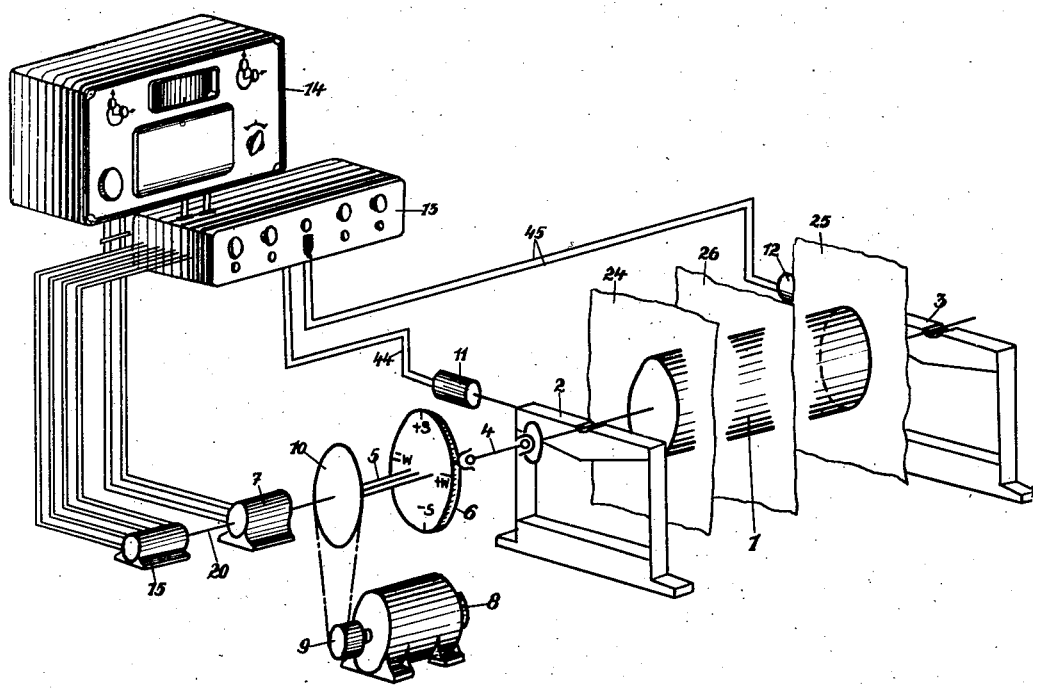
Fig. 1 is a perspective and schematic illustration of the balancing machine comprising the invention, and shows a cylindrical rotor in place for unbalance analysis.
Fig. 2 illustrates a first embodiment of the special generator for producing reference voltages when using amplitude-responsive pickups.
Fig. 3 illustrates a second embodiment of the special generator for producing reference voltages when using pressure-responsive pickups.

With the method according to our invention, measuring runs of the rotor in the balancing machine at respectively different speeds, namely, for low-speed and high-speed balancing, may immediately follow each other without interruption. This is achieved by producing, during the measuring runs, adjustable compensating voltages or currents which vary with the revolving speed of a rotor of constant unbalance in the same manner as the voltages or currents of the vibration pickup means, and superimposing these compensating voltages upon the pickup voltages or currents supplied to the measuring instrument, the superposition being such that, when operating with an elastic rotor of variable unbalance, the low-speed indications of the measuring instrument are neutralized during the high-speed measuring run.

The apparatus according to our invention for affording the foregoing operation is characterized by the provision of the above-mentioned special or neutralizing generator whose voltage or current generating elements are of the same kind as the pickups that translate the unbalance vibrations into electric voltages or currents; and this neutralizing generator is driven in synchronous and correct angular relation to the rotor to be balanced.

In the balancing machine according to Fig. 1, the rotor 1 to be balanced is journaled on oscillatory bearing bridges 2, 3 of the balancing machine. The rotor is driven by a motor 8 through belt pulleys 9, 10, a shaft 5, and a Cardanic joint 4. Two pickups 11 and 12 are connected with the bearing bridges 2, 3, respectively, to transform the unbalance-responsive vibrations of the bearing bridges into alternating voltages or currents that are supplied through a compensating device 13 to the measuring instrument 14. The shaft 5 drives the phase-reference transmitter 7 as well as the special neutralizing generator 15 according to the invention in synchronous and correct angular relation to the rotor. The currents generated by the phase-reference transmitter 7 are supplied to the measuring device 14, while the currents produced in the generator 15 pass to the compensating device 13 in which they can be adjusted and positively or negatively added to the currents flowing from the pickups 11, 12 to the measuring instrument 14, as hereinbelow described in detail.

For balancing machines equipped with amplitude-responsive pickups 11 and 12, such pickup preferably being used for the measurement of rotor operating at supercritical speeds, the neutralizing generator 15 comprises vibration pickups 16, 16' and 17, 17' (Fig. 2) each having a moving coil C arranged in an annular field or gap of a permanent magnet M as is illustrated schematically in Fig. 4. The pairs of vibration pickups 16, 16' and 17, 17' are kept in sinusoidal motion of constant amplitude, in 90° phase displaced relation, by means of a generator shaft 20 coupled with the rotor and equipped with motion transmitting cams 18 and 19.

For balancing machines equipped with pressure responsive pickups, as is preferred in the measurement of rotors operating below critical speed, the neutralizing generator according to the invention can be constructed according to Fig. 3. In Fig. 3 the generator shaft 21, connected with the rotor being analyzed as shown for the generator 15 of Fig. 1, is provided with an unbalance weight 22. The forces produced in the bearings by the revolution of the unbalance weight 22 serve to produce electric voltages in opposed pairs of 90° phase displaced piezoelectric pickups 23, or alternatively in other suitable pressure-responsive measuring elements such as resistance strain gauges.

The operation of balancing apparatus for balancing elastic rotary bodies in a single measuring run will now be explained with reference to the example of an amplitude measuring machine designed for the indication of the individual unbalance components. The complete electrical circuit for such a system is illustrated in Fig. 5.

The illustrated analyzing apparatus 14 (Fig. 5) is equipped with a wattmeter $20a$ with two stationary field coils (current coils) $21a$, $22a$, and two moving coils (voltage coils) $23a$ and $24a$. The moving coils $23a$ and $24a$ are mounted on a spindle $25a$ which carries an indicating pointer $26a$ and is normally biased by a spring force so that the pointer is in a midposition to indicate zero. Each of coil pairs $21a$, $23a$ and $22a$, $24a$ may be considered a separate wattmeter system capable of imposing its own component torque upon the spindle $25a$. Hence, the deflection of pointer $26a$ depends upon the resultant torque value. The setting of apparatus 14 may be such that, for instance, this resultant value is the difference between the two component torques.

Consider now one of the two component wattmeter systems, for instance that comprising the coils $21a$ and $23a$. Such a system measures a vectorial product. That is, the deflection caused by the component torque depends upon the product of the respective currents flowing in the coils $21a$, $23a$ times the cosine of the angle between these currents, it being assumed, as is here the case, that both currents have the same frequency. When the current in field coil $21a$ is in phase, or exactly 180° out of phase, with the pickup current in coil $23a$, the cosine of the phase angle is unity so that the algebraic product of the two coil currents is measured. When the two currents are 90° or 270° out of phase, the cosine is zero and the measured product is likewise zero so that no torque and no deflection is produced. This applies analogously to the component wattmeter system comprising the coils $22a$ and $24a$.

Two phase-reference currents from phase transmitter 7 are selectively available, one being 90° phase displaced relative to the other. When one of these currents passes through the two wattmeter field coils 21a and 22a, the wattmeter responds only to pickup currents in phase, or 180° out of phase, with this one phase-reference current. Consequently, depending upon which of the two phase-different reference currents is selected, the wattmeter indicates either only "vertical" unbalance components or only "horizontal" unbalance components.

For permitting a selection between "vertical" and "horizontal" indications and also a selection between the "right" and "left" correction planes 25 and 24 (Fig. 1) in which the unbalance components are to be measured, the apparatus 14 has a ganged four-position switch 30 (Fig. 5), which, for convenience, is shown in three parts, 30a, 30b and 30c, all joined together to be placeable into any one of four positions LV, LH, RV, and RH.

The switch 30 (30a, 30b, 30c), depending upon its selected position, connects one or the other of the lead pairs 15a, 16a, coming from the two terminal groups V and H of the phase-reference transmitter 7, with the wattmeter field coils 21a and 22a. The connection extends in apparatus 14 through balance-adjusting rheostat devices 32 and 32a, and also through polarity reversing switches 33, 34 and 33a, 34a in series with sensitivity-adjusting rheostats 35 and 35a. The reversing switches 33, 33a and 34, 34a control the polarity of the current in coils 21a, 22a for permitting a correction of unbalance, either by addition or by removal of material from the rotor as may be desired, or for changing the indication from plus to minus as may be required during the balance-analyzing procedure.

In the illustrated position LV (Fig. 5) of the four-position switch, the just-mentioned circuit connection may be traced as follows. The right-hand lead 15a from transmitter 7 is connected by switch portions 30a, 30b and switch 34 through rheostat 35 to the tap points of rheostat device 32. From these tap points, the circuit has one branch extending through switch portions 30c and wattmeter field coil 22a and back through switches 30c, 34, 30b, 30a to the left-hand lead 15a. Another circuit branch extends from the tap of rheostat device 32 through switch 33 to wattmeter coil 21a and thence back through switches 33, 34, 30b, 30a to the same left-hand lead 15a. It will be noted that the two field coils 21a and 22a are connected in parallel with each other and that the current flowing from the V terminals of transmitter 7 through each field coil can be varied relative to the current in the other coil by changing the tap setting of rheostat device 32. This circuit selection for indicating vertical unbalance in the left correction plane is indicated by one of four lamps, this particular lamp being denoted by LV in Fig. 5. The lamp LV is connected by switch portion 30a across the two leads 16a to be energized from the H terminals of transmitter 7.

Assume now that an unbalanced rotor is revolving in the balancing machine shown in Fig. 1 at the first speed at which measurements are taken, a speed below 0.5 to 0.6 times the first critical revolving speed, and that the balance measuring apparatus 14 as shown in Fig. 5 has its four-position switch set to the illustrated position LV for indicating the vertical unbalance component in the left-hand correction plane 24. For the time being disregard the presence of the compensative device 13 (i. e., assume that the switches 19a and 19b in Fig. 5 are both closed). Under these conditions, both pickups 11 and 12 will normally pass current through leads 17a, 18a to the respective moving coils 23a and 24a so that the wattmeter will be subjected to two component torques and hence will respond to the resultant torque. That is, the wattmeter indication is normally a function of the horizontal unbalance component in the right correction plane as well as a function of the horizontal unbalance component in the left correction plane. It is, therefore, necessary to make a compensating adjustment for eliminating the horizontal unbalance in the left correction plane as regards its effect upon the wattmeter indication. To this end, the tap of compensating rheostat device 32 is placed into a position in which the component torque in the right system of coils 21a, 23a is balanced by part of the torque in the left wattmeter system of coils 22a, 24a, or vice versa. With such an adjustment, the wattmeter indicates only vertical unbalance in the left correction plane of the rotor as a rigid body.

With respect to the indication of the three other unbalance components (LH, RV, RH), the circuit settings and operating conditions are analogously similar, it being merely necessary to set the four-position switch into the particular position corresponding with the unbalance component to be measured.

Fig. 5 further illustrates the circuit connection within the compensating device 13. Denoted by 34 and 35 are two moving coils of the neutralizing generator 15 for the 0° component, and denoted by 36 and 37 are the moving coils of the same generator for the 90° component of the indication in instrument 14. The voltages of these moving coils are impressed across regulating potentiometers 38, 39, 40 and 41 which are provided with displaceable mid-taps. When the ganged switch 19a, 19b is open, the potentiometers permit an adjustable addition or subtraction of the currents from generator 15 relative to the currents flowing in the leads 17a and 18a from the vibration pickups to the measuring instrument 14.

In accordance with the invention, after each individual component has been measured, as described above, and recorded, a corresponding potentiometer in the regulating device 13 is temporarily switched in by means of the ganged switch 19, 19a and adjusted to balance out the indicated reading produced by the pickups 11 and 12. After the four components measured during the low speed rotation have thus been nullified, the regulating device is allowed to remain switched in circuit with the pickups and the rotor is brought up to a speed of about 0.75 to 0.9 times the first critical revolving speed of the rotor for measurement of unbalance due to rotational distortion, the measurements being made by adjustment of the instrument 14 as described in connection with measurement at low speed rotation.

The newly-indicated values are caused by the bending deflection of the rotor at the higher revolving speed and make it possible to determine the necessary triple set of weights for the correction planes 24, 25 and 26. The weights required for obtaining balance in the rotor while it is behaving as a rigid rotor are known from the readings taken during the low-speed measuring run. By adding the component weights determined by the high-speed measuring run, the resultant weights in each of the three correction planes are determined as to magnitude and angular position without interrupting the unbalance analyzing performance.

The neutralizing generator 15 and the compensating device 13 may also be used for a convenient adjustment of the electric network in instrument 14 prior to the balancing of a series of similar rotors. As known, the electric network is needed for eliminating the effect of an unbalance in one correction plane (24) upon the indication of unbalance in the other correction plane (25). At first, a rotor of unknown unbalance is placed into the balancing machine and brought up to the balancing speed at which it is to be balanced as a rigid body. Now the compensating voltages or currents of the generator 15 are applied with the aid of the adjustable compensating device 13 to reduce the four unbalance indications in measuring instrument 14 to zero and to simulate a completely balanced rigid rotor. The balancing machine is then brought to stand-still. Thereafter a calibrating weight of known magnitude is added to the rotor in its left-hand correction plane 24, for instance, at an angular position corresponding to 0° of the scale disc 6. Similarly a second calibrating weight, likewise of known magnitude, is attached to the rotor in the right-hand correction plane 25 in the angular position 90° as indicated by the scale disc 6. Thereafter the balancing machine is again switched on. The vibrations now occurring at the bearing bridges 2 and 3 are caused by the original unbalance of the rotor as well as by the added calibrating weights. However, the measuring instrument 14 indicates only the effect of the calibrating weights. The electric network can now be adjusted in the usual manner so that the calibrating weight added in the left-hand correction plane 24 has no effect upon the measuring instrument 14 as regards indication of unbalance in the right-hand correction plane 25. During the same run, the calibrating weight in the right-hand correction plane 25 can be made to vanish as regards its effect upon the indication of unbalance in the left-hand correction plane 24. These adjustments are possible because of the different angular positions of the calibrating weights. Furthermore, after thus adjusting the electric network to the respective correction planes, the sensitivities, that is the ratios of calibrating weight to the indication, may be read off, for instance, in ounce inches per scale division, in millimeters drilling depth per scale division, or any other suitable unit. The values thus determined can then be used for pre-setting a correspondingly equipped machine tool for thereafter machining the rotor to eliminate its unbalance. After setting the balancing equipment in the above-described manner, the balancing machine is adjusted and calibrated for balancing a series of similar rotors.

It will be obvious to those skilled in the art, upon study of this disclosure, that our invention permits of various changes and modifications and may be embodied by means other than those specifically illustrated without departing from the spirit of the invention and within the scope of the following claims.

We claim:

1. Balancing machine apparatus for balancing non-rigid rotors, comprising means for rotating the rotor at a speed lower than that at which it deforms due to centrifugal forces of rotation, electrical means to measure the unbalance forces in said rotating rotor in two planes transverse to said rotor, electric means synchronous with the rotation of said rotor to neutralize said electrical measuring means at speeds lower than that at which rotor deformation takes place, said unbalance measuring means and said neutralizing means having similar voltage-speed characteristics so as to vary in the same way with speed of rotation of said rotor at speeds below that at which the rotor deforms, means to rotate the rotor at a speed higher than that at which it deforms due to centrifugal forces of rotation, and means to measure the difference values between said unbalance measuring means and said neutralizing means at said higher speed of rotation, whereby a triple-set of unbalance weights for balancing the rotor can be determined by means of a single run.

2. Balancing apparatus for elastic rotors comprising drive mechanism for rotating a rotor to be analyzed at a speed lower than that causing elastic deformation in the rotor, electrical pickup means mechanically actuated by said rotor means for measuring unbalance component values in the rotor in each of two planes perpendicular to the axis of rotation thereof, electrical means connected with said drive means to provide an electrical output varying as a function of the speed of rotation of said rotor, said function of variation being the same as the function of variation of electrical output with speed of rotation of said rotor for said electrical pickup at speeds below that at which the rotor deforms, said drive means being operative selectively to rotate the rotor at a speed higher than that at which it deforms due to centrifugal forces of rotation, and means to measure the difference values between said electrical pickup means and said electrical means at said higher speed of rotation.

3. Balancing apparatus as defined in claim 2 wherein said pickup means and said electrical means comprise transducers similarly responsive to mechanical amplitude.

4. Balancing apparatus as defined in claim 2 wherein said pickup means and said electrical means comprise transducers similarly responsive to mechanical pressure.

5. Balancing apparatus as defined in claim 2 wherein said pickup means and said electrical means comprise oscillating-coil electro-dynamic generators.

6. Balancing apparatus as defined in claim 2 wherein said pickup means and said electrical means comprise piezoelectric elements.

7. A balancing machine for rotors comprising drive mechanism for rotating the rotor at a given speed, electrical pickups in each of two planes perpendicular to the axis of rotation of said rotor, said pickups being operative to provide an electrical output dependent upon individual unbalance components in their respective planes of said rotor, electrical means connected with said drive mechanism to provide electrical outputs varying as a function of the speed of rotation of the rotor, said function of variation being the same as the function of variation of said pickup electrical output with speed of rotation of the rotor at speeds below that at which the rotor deforms, circuit means, including a current indicator, for combining the electrical outputs of said pickups so as to determine values proportional to unbalance components in each of said planes, and adjustable means for combining the outputs of said electrical means with the outputs of said pickups for nullifying their effect on said current indicator.

8. Balancing apparatus as defined in claim 7 wherein said pickup means and said electrical means comprise transducers similarly responsive to mechanical amplitude.

9. Balancing apparatus as defined in claim 7 wherein said pickup means and said electrical means comprise transducers similarly responsive to mechanical pressure.

10. Balancing apparatus as defined in claim 7 wherein said pickup means and said electrical means comprise oscillating-coil electro-dynamic generators.

11. Balancing apparatus as defined in claim 7 wherein said pickup means and said electrical means comprise piezoelectric elements.

References Cited in the file of this patent
UNITED STATES PATENTS

| | | |
|---|---|---|
| 2,243,379 | Johnson | May 27, 1941 |
| 2,315,578 | Baker | Apr. 6, 1943 |
| 2,363,373 | Werner | Nov. 21, 1944 |